May 21, 1968 A. HOLLUB 3,383,938
ACCELERATOR AND BRAKE CONTROL MECHANISM
Filed Oct. 19, 1966 2 Sheets-Sheet 1
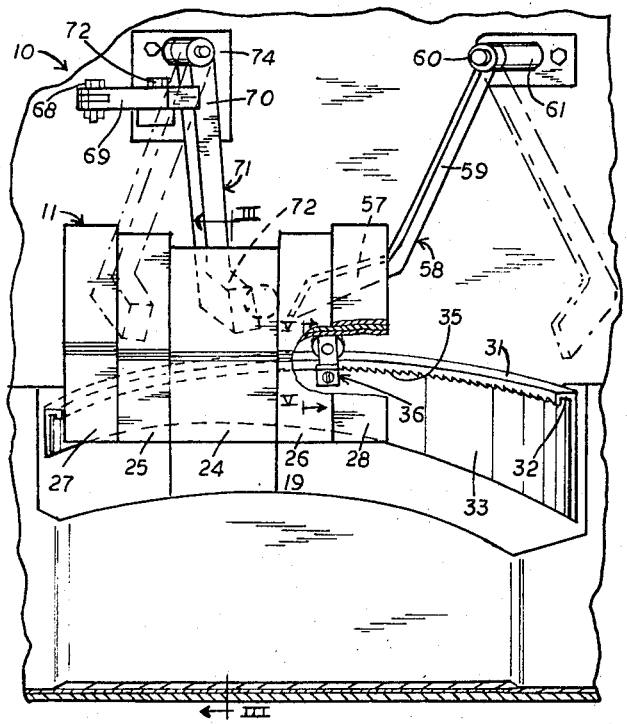
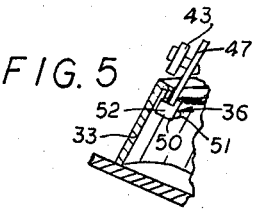
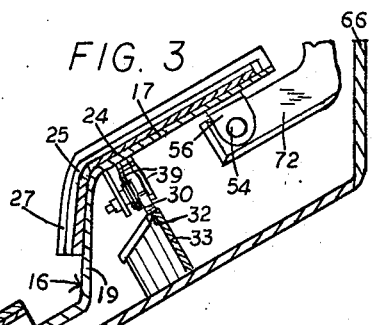
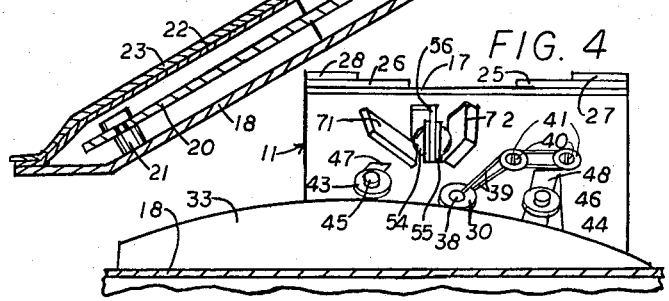
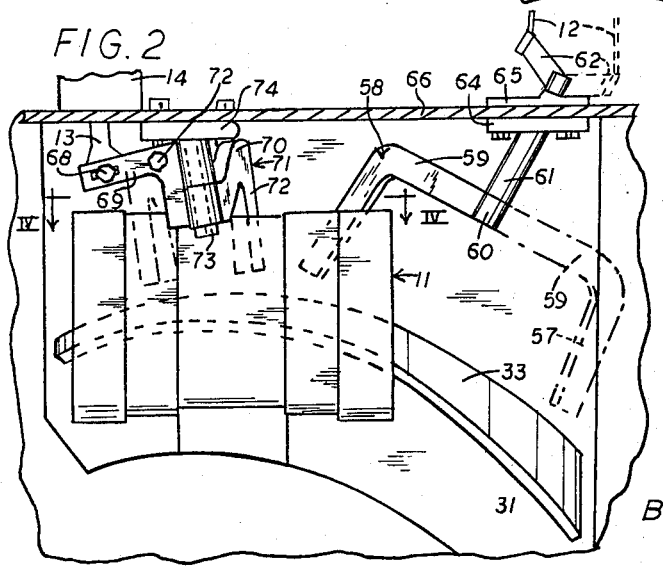
INVENTOR
ARTHUR HOLLUB
BY Alberts, Brezina & Lund
ATTORNEYS May 21, 1968 A. HOLLUB 3,383,938
ACCELERATOR AND BRAKE CONTROL MECHANISM
Filed Oct. 19, 1966 2 Sheets-Sheet 2
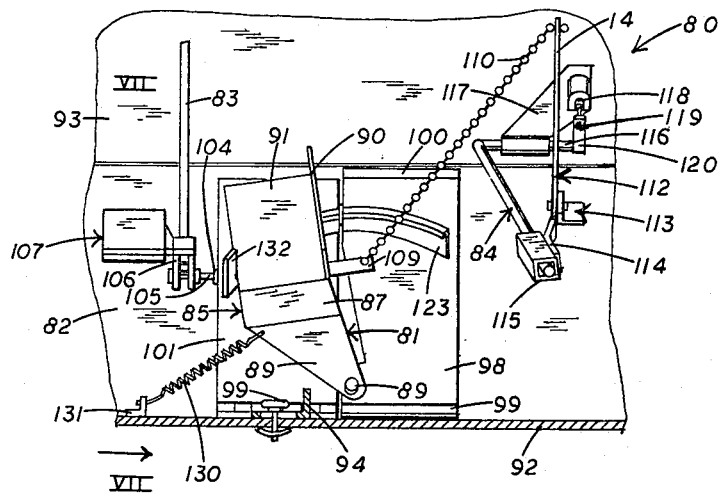
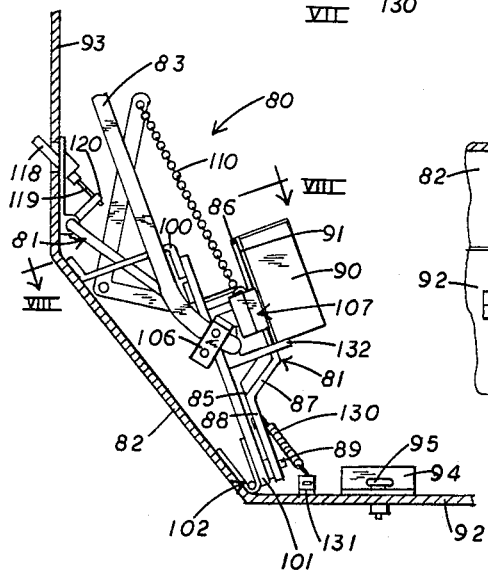
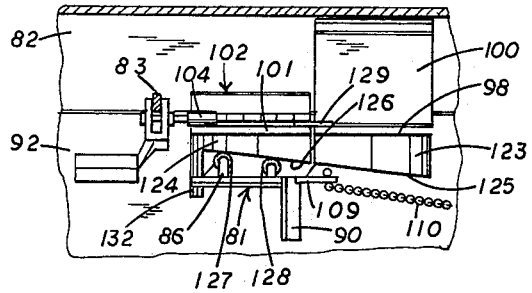
INVENTOR
ARTHUR HOLLUB
BY Alberts, Brezina + Lund
ATTORNEYS

United States Patent Office 3,383,938
Patented May 21, 1968

3,383,938
ACCELERATOR AND BRAKE CONTROL
MECHANISM
Arthur Hollub, 1029 W. Adams St.,
Chicago, Ill. 60607
Filed Oct. 19, 1966, Ser. No. 587,856
14 Claims. (Cl. 74—478.5)

ABSTRACT OF THE DISCLOSURE

Acceleration and brake control mechanism in which a foot control is pivotal in clockwise and counter-clockwise directions away from an intermediate position for respectively operating acceleration and brake control members. Cam means are preferably provided under the foot control for effecting counter-clockwise movement thereof in response to movement toward a floor plate, and anti-friction roller means are also preferably provided. In one embodiment, a single member on the floor plate provides an arcuately extending cam surface and a ball member is selectively engageable with a pair of members coupled to the acceleration and brake control members. In another embodiment, a member movable toward the floor plate defines a portion of an arcuately extending cam surface and is coupled to the brake control member.

---

This invention relates to accelerator and brake control mechanisms for automobiles or other vehicles and more particularly to mechanisms using a single foot control engageable by an operator's foot to control both acceleration and braking. The mechanisms of this invention are simple and straight-forward in construction and operation and are easily operated to provide a direct positive action in both acceleration and braking, while being rugged, safe, reliable and fool-proof.

Various mechanisms have heretofore been proposed for using a single foot control for both acceleration and braking. Such mechanisms have not been readily operated by a person accustomed to standard types of vehicles having separate foot controls for the acceleration and braking functions. In addition, the mechanisms heretofore proposed have been complex and subject to malfunctions, and have presented various objections from the standpoint of safety.

This invention was evolved with the general object of overcoming the disadvantages of prior art mechanisms and providing mechanisms which are easily operated while being safe and reliable.

According to this invention, a foot control is provided for engagement by the sole portion of an operator's shoe and is supported for sidewise movement in response to pivotal movement of the operator's shoe about the heel portion thereof, with means being provided for operating an acceleration control member in response to sidewise movement of the foot control away from the neutral position in the opposite direction. Preferably, the control is moved sidewise to the right to control acceleration and is moved sidewise to the left to control braking.

With this arrangement, the required movements of the operator's foot are similar to those required in operating a standard type of vehicle, but it is much easier to change between acceleration and braking since the operator's shoe is always in engagement with the single foot control and does not need to be lifted and shifted from one control to another. This is especially important from the standpoint of safety, since braking can be accomplished much more swiftly in an emergency situation.

A very important feature of the invention is in the provision of means operative in response to movement of the control toward a base-plate for moving the controls sidewise in the braking direction. This feature is very important in an emergency situation, because the normal reaction in such a situation is to press downward on the control and very serious accidents have resulted when operators, in a panic, have pressed down on the accelerator control, thereby increasing the speed of the vehicle and the impact with another vehicle.

A specific feature of the invention is in the provision of locking means for releasably locking the foot control in adjusted acceleration positions, so as to allow operation of the vehicle at a constant speed, without continual pressure on the foot control. Preferably, means are provided responsive to movement of the foot control toward the base plate for releasing the locking means and thereby providing for rapid braking.

Another specific feature of the invention is in the provision of an anti-friction ball member supported on the underside of the foot control in a position between a pair of members respectively coupled mechanically to acceleration and brake control members, to provide a direct action, to provide a simplified construction, and to obtain reliable operation with maximum safety.

Another specific feature of the invention is in the provision of anti-friction roller means for allowing free sidewise movement of the foot control.

A still further feature of the invention is in the support of the foot control for pivotal movement about an axis generally normal to the base plate and in proximity to the heel portion of the operator's foot with a support surface extending arcuately about the axis for engagement by roller means carried on the underside of the foot control. To obtain a cam action, the arcuately extending surface is inclined to urge the foot control in the braking direction when pressure is applied to move the foot control toward the base plate.

Still another specific feature of the invention is in the provision of downwardly facing ratchet teeth adjacent to the arcuately extending support surface with a dog carried by the foot control for engagement with the ratchet teeth, and with a spring-urged roller engaging the arcuately extending surface to urge the foot control upwardly and to engage the dog with the ratchet teeth, the foot control being movable downwardly to readily release the dog from the ratchet teeth.

In one preferred embodiment of the invention, means are provided responsive to sidewise movement of the foot control to the left to actuate the braking mechanism of the automobile. In this embodiment, the above-described cam action is particularly advantgeous in that the movement of the foot control toward the base plate automatically moves the foot control to the left, in the brake-actuating direction.

In another preferred embodiment of the invention, means are provided to allow inward movement of the foot control toward the base plate when it is positioned to the left, and means are provided to directly respond to such inward movement of the foot control to actuate the braking mechanism of the automobile.

Further features of the invention relate to the construction of the mechanisms in a manner such as to obtain maximum reliability and maximum safety, and to arrangements such that the mechanisms can be readily installed in existing vehicles having standard types of mechanisms. It will be understood that the mechanisms can, however, be designed for installation as original equipment on a vehicle at the time of manufacture thereof.

This invention contemplates other and more specific objects, features and advantages which will become more fully apparent from the following detailed description taken in conjunction with the accompanying drawings which illustrate a preferred embodiment and in which:

FIGURE 1 is a front elevational view of an accelerator and brake control mechanism constructed in accordance with the principles of this invention;

FIGURE 2 is a top plan view of the mechanism of FIGURE 1;

FIGURE 3 is a sectional view taken substantially along the line III—III of FIGURE 1;

FIGURE 4 is a sectional view taken substantially along line IV—IV of FIGURE 2;

FIGURE 5 is a sectional view taken substantially on line V—V of FIGURE 1;

FIGURE 6 is a front elevational view of a modified form of accelerator and brake control mechanism constructed in accordance with the principles of this invention;

FIGURE 7 is a sectional view taken substantially along line VII—VII of FIGURE 6; and FIGURE 8 is a sectional view taken substantially along line VIII—VIII of FIGURE 7.

Reference numeral 10 generally designates an accelerator and brake control mechanism constructed in accordance with the principles of this invention. In general, the mechanism 10 comprises a foot control 11 adapted to be engaged by the sole portion of an operator's shoe and supported for sidewise movement in response to pivotal movement of the operator's shoe about the heel portion thereof. The control 11 is illustrated in a neutral or intermediate position. When moved to the right, as viewed in FIGURES 1 and 2, a control member or cable 12 is moved rearwardly, the cable 12 being preferably connected in conventional fashion to the throttle valve on the carburetor of an automobile engine. When the foot control 11 is moved to the left from the illustrated neutral position, a brake control member 13 is moved forwardly, the member 13 being preferably connected to the piston of a conventional master cylinder 14. It will be noted that the movement of the operator's foot is thus similar to the movement required in operating the separate accelerator and braking controls of a conventional automobile, but it is not necessary for the operator to lift his foot to change from one control to another, and his foot is always in a position to effect immediate braking, which is especially desirable in emergency situations.

The foot control 11 comprises a plate 16 having a forward end portion 17 in spaced generally parallel relation above an inclined base or floor plate 18, an intermediate generally vertical portion 19, and a rearward portion 20 in relatively closely spaced parallel relation to the inclined floor plate 18. The rearward end of the rearward portion 20 is supported on a post 21, secured to the floor plate 18, for pivotal movement about an axis generally normal to the floor plate 18 and in proximity to the heel portion of the operator's foot. Preferably, a plate 22 is secured to the floor plate 18 in spaced relation above the rearward portion 20 of the foot control plate 16, with a suitable floor covering material 23 being disposed over the plate 22, for engagement by the heel portion of the operator's shoe.

The forward portion 17 of the foot control plate 16 and also the upper part of the intermediate portion 19 thereof, are preferably substantially wider than the rearward portion 20 and are so covered as to prevent slippage of the operator's shoe relative thereto. In particular, a layer 24 of rubber or the like is applied directly over the portion 17 and the upper portion 19, a pair of layers 25 and 26 are applied over outer side portions of the layer 24, and another pair of layers 27 and 28 are applied over outer side portions of the layers 25 and 26. With this arrangement, inwardly facing shoulders are provided on the inner edges of the layers 25–28, to facilitate sidewise movement of the foot control 11 without slippage of the operator's foot relative thereto.

To support the foot control for sidewise movement, a roller 30 is supported from the underside of the portion 17 and plate 16 and is engageable with a surface 31 extending arcuately about the axis of pivotal movement of the foot control on the post 21. In the illustrated construction, the arcuately extending surface 31 is defined by a rearwardly extending narrow flange portion 32 at the upper edge of a curved plate 33 having its lower edge welded or otherwise secured to the floor plate 18.

In accordance with a specific feature of the invention, the rearward edge of the flange portion 32 is turned downwardly and is formed with ratchet teeth 35 engageable by a dog member 36 suported from the foot control 11, to releasably lock the foot control 11 against movement to the left after it is moved to the right to a desired acceleration control position. This arrangement permits the operator to lift and rest his foot while continuing operation of the vehicle at a substantially constant rate of speed.

The foot control 11 is urged upwardly to effect engagement of the dog 36 with the teeth 35, but it is movable downwardly against spring action to disengage the dog 36 from the teeth 35, and to thereby permit movement of the foot control 11 to the left, for braking. For this purpose, the roller 30 is supported on a shaft 38 which is carried at the ends of a pair of resilient spring wire members 39 having portions secured against the lower surface of the plate portion 17 by screws 40 and washers 41.

A very important feature of the invention resides in the provision of cam means for urging the foot control 11 in braking direction when it is moved toward the base or floor plate 18. In the illustrated construction, the arcuately extending surface 31, defined by the flange 32 on the plate 33, is inclined to provide the cam action, the spacing between the right end of the surface 31 and the floor plate 18 being substantially greater than the spacing between the left end, the surface 31 and the floor plate 18. With this arrangement, downward pressure on the foot control results in sidewise movement thereof to the left to effect braking. As previously indicated, this is especially important since the normal operator reaction in an emergency or panic situation is to press down hard on the foot control.

To provide more stable and positive support for the foot control 11, particularly in the braking movement thereof, an additional pair of rollers 43 and 44 are provided on opposite sides of the roller 30 for engagement with the surface 31. Preferably, the rollers 43 and 44 are journaled on pins 45 and 46 rigidly secured to plate portions 47 and 48, which are preferably struck-out from the plate 16. When the foot control 11 is moved downwardly, all three rollers 30, 43 and 44 engage the surface 31 and through camming action, the foot control 11 is moved to the left to effect braking.

As shown in FIGURES 1 and 5, the dog 36 is preferably formed by an L-shaped plate having one leg 50 secured against the lower end of the plate portion 47 by a screw 51, with the upper edge of the other leg 52 thereof being preferably sharpened for engagement with the ratchet teeth 35. In the event that the releasable locking feature is not desired, the dog 36 may be removed by removing the screw 51.

In accordance with a further feature of the invention, an anti-friction ball member 54 is journaled in a sleeve 55, held by one leg of an L-shaped member 56 the other leg of which is welded or otherwise secured to the lower surface of the plate portion 17. The ball member 54 is disposed between and engageable with a pair of members which extend under the brake control 11 and which are coupled mechanically to the acceleration and brake control members 12 and 13. In particular, the ball member 54 is engageable with a downwardly and forwardly extending leg 57 of a generally L-shaped lever 58 having a second leg 59 secured at its upper end to a hub 60 which is secured to one end of a shaft, the opposite end of the shaft 61 being secured to an arm 62 connected to the acceleration control member or cable 12. The shaft 61 is journaled within a sleeve 63 which is integrally secured on a plate 64, plate 64 being bolted to a plate 65 on the opposite side of a vertically extending wall 66 of the automobile. The lever 58 assumes the position illustrated in full and dotted lines when the foot control 11 is in the neutral position as illustrated in broken lines, to move the control cable 12 rearwardly.

To operate the brake control member 13, it is connected by means of a bolt 68 to one arm of a bell crank lever 69 having a second arm engageable by a generally vertical leg 70 of an L-shaped lever 71 having a second leg 72 extending downwardly and inwardly under the foot control 11 for engagement by the ball member 54. The bell crank lever 69 and the lever 71 are supported for pivotal movement on a bracket 74, by means of bolts 72 and 73, respectively, bracket 74 being bolted to the wall 66. When the foot control 11 is moved to the left, the ball member 54 engages the leg 72 of lever 71 to move the lever 71 to the left, in a counterclockwise direction as viewed in FIGURE 1, to engage one leg of the lever 69 and to cause the other leg thereof to move the member 13 inwardly, and thus operate the master brake cylinder 14. Thus, a direct and positive operation of the accelerator and brake control members is obtained. It will be understood, of course, that other types of mechanisms may be used for operating the accelerator and brake control members in response to sidewise movements of the foot control 11.

Referring to FIGURES 6, 7 and 8, reference numeral 80 generally designates a modified form of an accelerator and brake control mechanism constructed in accordance with the principles of this invention. The illustrated mechanism 80 comprises a foot control 81, similar to the foot control 11 adapted to be engaged by the sole portion of an operator's shoe and supported for sidewise movement in response to pivotal movement of the operator's shoe about the heel portion thereof.

The control 81 is illustrated in a position displaced to the left from an intermediate position, in which it can be moved directly inwardly toward a floor plate portion 82, and mechanism is provided for then operating a lever 83 which is mechanically coupled to brake-operating mechanism in a conventional fashion. When the foot control 81 is moved to the right, another mechanism is operative to operate a lever 84 which is mechanically coupled to the throttle valve on the carburetor of an automobile engine. In this arrangement, as in the other embodiment, the movement of the operator's foot is thus similar to the movement required in operating the separate accelerator and braking controls of a conventional automobile, but is not necessary for the operator to lift his foot to change from one control to another and his foot is always in a position to effect immediate braking, which is especially desirable in emergency situations.

The foot control 81 comprises a plate 85 having a forward or upper end portion 86, an intermediate angularly extending portion 87 and a rearward or downward portion 88, the portion 88 being closer to the floor plate portion 82. The lower end of the portion 88 is supported on a post 89 for pivotal movement about an axis generally normal to the floor plate portion 82.

A plate 90 is preferably secured to the right-hand edge of the portion 86 of plate 85, for engagement by the right-hand side of the operator's shoe, and an anti-friction covering 91 is preferably secured to the outer face of the portion 86.

As shown, the floor plate portion 82 extends angularly upwardly and forwardly from a generally horizontal floor plate portion 92 to a vertical wall 93 which separates the engine and passenger compartments of the vehicle. A generally L-shaped bracket 94 is preferably secured to the floor plate portion 92 for engagement by the heel of the operator's shoe, the bracket 94 being preferably secured to the floor plate portion 92 by means of a thumb screw 95 extending through an elongated slot in the horizontal leg of the bracket 94 to a plate 96 on the underside of the floor plate portion 92, the arrangement being such as to permit adjustment of the position of the bracket 94 in accordance with the size of the shoe and preferences of the operator.

The post 89 which pivotally supports the foot control 81 is secured to the lower end of a fixed plate 98. The lower end portion of the plate 98 is secured to the floor plate portion 82 by bracket 99 while the upper end of the plate 98 is secured to the floor plate portion 82 by a bracket 100. A second plate 101, similar to the plate 98, is supported alongside the plate 98 through an arrangement which permits it to be moved directly inwardly toward the floor plate portion 82. In particular, the lower end of the plate 101 is secured to the floor plate portion 82 by means of a hinge 102 which permits inward pivotal movement of the plate 101 about a horizontal axis adjacent the lower end of the plate 101. The undersurface of the plate 101 is engageable with a roller 104 which is carried by a shaft 105 which is supported from the brake control lever 83 by means of a bracket 106. When the plate 101 is pivoted inwardly toward the floor plate portion 82, the plate 101 engages the roller 104 to move the brake control lever 83 inwardly, and thus operate the brake of the vehicle.

The bracket 106 preferably supports an auxiliary foot control 107 which can be operated by the operator's foot. The member 107 may be engaged by the right shoe of the operator in conventional fashion, or may be engaged and operated by the left shoe of the operator if desired. In some circumstances, where it is desirable to apply braking force and feed additional fuel to the engine at the same time, the member 107 may be engaged by the left shoe of the operator, while the control 81 is operated by the right shoe of the operator.

To operate the acceleration control lever 84, a tab plate 109 which projects from the right side of the foot control 81, is connected through a flexible ball chain 110 to the upper end of one arm 111 of a lever 112 which is pivotally supported from the floor plate portion 82 by means of an L-shaped bracket 113. The lever 112 has a second arm 114 which carries a hollow rectangular sleeve 115 receiving the end of the control lever 84. The opposite end of the control lever 84 is integrally connected with a shaft portion 116 which is journaled by a bracket 117 on the wall 93. The bracket 117 also supports an end of a flexible housing 118 within which a wire 119 is disposed, one end of the wire 119 being connected to the throttle valve on the carburetor of the engine of the vehicle and the other end of the wire being connected to the end of a lever arm 120 on the shaft 116.

When the foot control is pivoted to the right, in a clockwise direction as viewed in FIGURE 6, the tab plate 109 is moved toward the horizontal floor plate portion 92 and the upper end of the lever arm 111 is pulled rearwardly and downwardly. The lever arm 114 then functions to move the lever arm 84 downwardly and the wire 119 is pulled rearwardly to open the throttle valve of the engine.

Means are provided to define a support surface extending arcuately about the axis of the post 89 and under the foot control 81, to support the foot control 81 during its pivotal movement. In particular, the plates 98 and 101 carry arcuate segments 123 and 124 having upper surfaces 125 and 126 extending in an arc about the axis of the post 89. The foot control 81 carries a pair of rollers 127 and 128 engageable with the surfaces 125 and 126. Preferably, the surfaces 125 and 126 are inclined, as best shown in FIGURE 8, so that pressure on the foot control 81 tends to force the foot control 81 to the left, by a camming action.

A plate 129 is affixed to the plate 101 to engage the plate 89 and to limit outward movement of the plate 101 so as to align the arcuate segments 123 and 124.

To aid in urging the foot control 81 toward the braking position, a coiled tension spring 130 is provided, connected at one end to the foot control 81 and at the opposite end thereof to an L-shaped bracket 131 which is secured to the floor plate portion 92. A stop member 132 projects upwardly and rearwardly from the left-hand end of the arcuate support 124 to limit counterclockwise movement of the foot control 81.

The mechanism illustrated in FIGURES 6–8 is extremely easy to operate, while being very safe. When the operator desires to accelerate the vehicle, he merely turns his foot to the right which operates to open the throttle valve of the carburetor of the engine in the manner as above described. For braking, he merely turns his foot to the left to allow the foot control 81 to move under the influence of the spring 130 until it is in a braking position as illustrated. He can then press the foot control 81 toward the floor plate portion 82, to operate the brake control lever 83.

Although not illustrated in FIGURES 6–8, it will be understood that releasable locking means may be provided for locking the foot control 81 in an adjusted position, as by providing ratchet teeth on the segment 123, engageable by a dog carried by the foot control 81.

It will be understood that other modifications and variations may be effected without departing from the spirit and scope of the novel concepts of this invention.

I claim as my invention:

1. In a control for a vehicle having a floor plate and having engine means including an acceleration control member and brake means including a braking control member, a foot control adapted for engagement by the sole portion of an operator's shoe, supporting means for supporting said foot control from said floor plate for sidewise movement in response to pivotal movement of the operator's shoe about the heel portion thereof, first motion transmitting means for operating said acceleration control member when said foot control is moved sidewise in one direction away from an intermediate position, second motion transmitting means for operating said braking control member when said foot control is moved sidewise away from said intermediate position in the opposite direction, locking means for releasably locking said foot control in adjusted positions thereof displaced in one direction from said intermediate position, and means responsive to movement of said foot control toward said floor plate for releasing said locking means.

2. In a control for a vehicle having a floor plate and having engine means including an acceleration control member and brake means including a braking control member, a foot control adapted for engagement by the sole portion of an operator's shoe, supporting means for supporting said foot control from said floor plate for sidewise movement in response to pivotal movement of the operator's shoe about the heel portion thereof, first motion transmitting means for operating said acceleration control member when said foot control is moved sidewise in one direction away from an intermediate position, second motion transmitting means for operating said braking control member when said foot control is moved sidewise away from said intermediate position in the opposite direction, said first and second motion transmitting means including an anti-friction ball member supported on the underside of said foot control and a pair of members respectively coupled mechanically to said acceleration and brake control members and extending under said foot control on opposite sides of said ball member for selective engagement by said ball member upon said movement of said foot control in said one and said opposite direction.

3. In a control for a vehicle having a floor plate and having engine means including an acceleration control member and brake means including a braking control member, a foot control adapted for engagement by the sole portion of an operator's shoe, supporting means for supporting said foot control from said floor plate for sidewise movement in response to pivotal movement of the operator's shoe about the heel portion thereof, first motion transmitting means for operating said acceleration control member when said foot control is moved sidewise in one direction away from an intermediate position, second motion transmitting means for operating said braking control member when said foot control is moved sidewise away from said intermediate position in the opposite direction, said supporting means including means supporting said foot control for pivotal movement about an axis generally normal to said floor plate and in proximity to the heel portion of the operator's foot, means defining a support surface extending arcuately about said axis and under said foot control, and roller means carried on the underside of said foot control for engagement with said arcuately extending support surface.

4. In a vehicle control as defined in claim 3, said arcuately extending support surface being inclined to cam said foot control in said opposite direction in response to movement of said foot control toward said base plate.

5. In a vehicle control as defined in claim 3, said roller means including a spring-urged roller for engagement with said arcuately extending surface to urge said foot control upwardly, means defining downwardly-facing ratchet teeth adjacent said arcuately extending support surface, and a dog carried by said foot control for engagement with said ratchet teeth to lock the foot control in an adjusted position and for disengagement from said ratchet teeth in response to movement of said foot control downwardly.

6. In a vehicle control as defined in claim 5, said roller means further including a pair of additional rollers on opposite sides of said spring-urged roller for engagement with said arcuately extending surface upon downward movement of said foot control.

7. In a control for a vehicle having a floor plate and having engine means including an acceleration control member and brake means including a braking control member, a foot control adapted for engagement by the sole portion of an operator's shoe, supporting means for supporting said foot control from said floor plate for sidewise movement in response to pivotal movement of the operator's shoe about the heel portion thereof, first motion transmitting means for operating said acceleration control member when said foot control is moved sidewise in one direction away from an intermediate position, second motion transmitting means for operating said braking control member when said foot control is moved sidewise away from said intermediate position in the opposite direction, first and second support plates disposed in side-by-side relation and respectively underlying said foot control when said foot control is in positions displaced in said one direction and said opposite direction from said intermediate position, means supporting said first support plate in a fixed position on said floor plate, and means supporting said second support plate for movement directly inwardly toward said floor plate, said second motion transmitting means including means responsive to said inward movement of said second support plate for operating said braking control member.

8. In a vehicle control as defined in claim 7, anti-friction roller means supporting said foot control for movement over said support plates.

9. In a vehicle control as defined in claim 7, means supporting said foot control for pivotal movement about an axis generally normal to said floor plate and in proximity to the heel portion of the operator's foot, means on said support plates defining a support surface extending arcuately about said axis, and roller means on the underside of said foot control for engagement with said arcuately extending support surface.

10. In a vehicle control as defined in claim 9, said arcuately extending support surface being inclined to cam said foot control in said opposite direction in response to movement of said foot control toward said floor plate.

11. In a control for a vehicle having a floor plate and having engine means including an acceleration control member and braking means including a braking control member, a foot control adapted for engagement by the sole portion of an operator's shoe, supporting means for supporting said foot control from said floor plate to allow pivotal movement thereof about a first axis generally normal to the floor plate and also about a second axis generally parallel to the floor plate with both said first and second axes being in proximity to the heel portion of the operator's foot, first motion transmitting means for operating said acceleration control member when said foot control is pivoted about said first axis in a clockwise direction away from an intermediate position, second motion transmitting means for operating said brake control member when said foot control is pivoted about said first axis in a counter-clockwise direction away from said intermediate position, and cam means arranged for support on said floor plate and including an inclined surface underlying said foot control for effecting counter-clockwise movement of said foot control in response to movement thereof about said second axis toward said floor plate.

12. In a vehicle control as defined in claim 11, said cam means being operative throughout substantially the full range of pivotal movement of said foot control about said first axis.

13. In a vehicle control as defined in claim 11, said cam means comprising a member arranged for support in fixed relation to said floor plate and operative throughout substantially the full range of pivotal movement of said foot control about said first axis.

14. In a vehicle control as defined in claim 11, said cam means comprising a first member operative in positions of said foot control between said intermediate position and positions displaced in a clockwise direction from said intermediate position and a second member operative in positions of said foot control between said intermediate position and positions displaced in a counter-clockwise direction away from said intermediate position, means for fixedly supporting said first member from said floor plate, means for supporting said second member for movement thereof toward said floor plate, said second motion transmitting means including means coupled to said second cam member for operating said braking control member in response to movement of said second cam member toward said floor plate.

References Cited
UNITED STATES PATENTS

| | | | |
|---|---|---|---|
| 2,392,086 | 1/1946 | Fischer | 192—3 |
| 2,707,036 | 4/1955 | Hollub | 192—3 |
| 3,029,916 | 4/1962 | Luijt | 192—3 |

FRED C. MATTERN, Jr., *Primary Examiner.*

MILTON KAUFMAN, *Examiner.*

B. T. CALLAHAN, *Assistant Examiner.*